(12) United States Patent
Denichou (10) Patent No.: US 9,043,153 B2
(45) Date of Patent: May 26, 2015

(54) MAXIMUM DEPTH OF INVESTIGATION OF MEASUREMENTS IN A FORMATION

(75) Inventor: Jean-Michel Denichou, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 568 days.

(21) Appl. No.: 13/048,833

(22) Filed: Mar. 15, 2011

(65) Prior Publication Data

US 2012/0239300 A1    Sep. 20, 2012

(51) Int. Cl.
*G06F 19/00*     (2011.01)
*G01V 3/18*      (2006.01)

(52) U.S. Cl.
CPC ......................................... *G01V 3/18* (2013.01)

(58) Field of Classification Search
USPC .................. 702/6–7, 9, 11; 324/338–339, 346
See application file for complete search history.

(56) References Cited

U.S. PATENT DOCUMENTS

| | | | |
|---|---|---|---|
| 6,188,222 B1 * | 2/2001 | Seydoux et al. | ............... 324/339 |
| 6,903,553 B2 * | 6/2005 | Itskovich et al. | ............. 324/339 |
| 6,937,022 B2 | 8/2005 | Itskovich et al. | |
| 2001/0032051 A1 | 10/2001 | Grismore et al. | |
| 2009/0157320 A1 | 6/2009 | Abubakar et al. | |
| 2010/0165791 A1 | 7/2010 | Lie | |
| 2010/0259415 A1 * | 10/2010 | Strachan et al. | ........... 340/853.6 |

OTHER PUBLICATIONS

International Search Report & Written Opinion issued in PCT/US2012/028067 on Sep. 27, 2012; 9 pages.

* cited by examiner

*Primary Examiner* — John Breene
*Assistant Examiner* — Hien Vo
(74) *Attorney, Agent, or Firm* — Kimberly Ballew (57) ABSTRACT

The present disclosure relates to a method to determine a volume of clearance surrounding a wellbore. A logging tool is provided. The logging tool may be disposed on a wireline, a drill string, or a wired drill pipe. A formation property is obtained using the logging tool. The formation property may include a voltage, a bulk resistivity, a horizontal resistivity, a vertical resistivity, a porosity, a permeability, a fluid saturation, an NMR relaxation time, a borehole size, a borehole shape, a borehole fluid composition, an MWD parameter, or an LWD parameter. The maximum depth of investigation into the subsurface formation is determined using a model response and a noise level, and the volume of clearance is determined using the determined maximum depth of investigation. The maximum depth of investigation and volume of clearance may be determined even though no boundary layers are detected.

20 Claims, 5 Drawing Sheets

MAXIMUM DEPTH OF INVESTIGATION OF MEASUREMENTS IN A FORMATION

CROSS-REFERENCE TO OTHER APPLICATIONS

N/A

BACKGROUND

1. Technical Field

The present disclosure relates generally to the logging of subsurface formations surrounding a wellbore using a downhole logging tool, and particularly to determining the maximum depth of investigation of measurements made in the formations.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling.

Prior art tools and methods have focused on determining and displaying (mapping) the distance between a measurement sensor carried on the tool and a bed boundary. Identification of a bed boundary is typically characterized by a change in one or more petrophysical properties of the formation. Various techniques and workflows exist to evaluate the distance to the boundary, but none of those allow one to determine the formation volume investigated by deep and azimuthal measurements in the absence of a recognizable bed boundary, or in the case of a measurement that reads beyond a relatively near bed boundary deep into an adjacent formation layer.

SUMMARY

The present disclosure relates to a method to determine a volume of clearance surrounding a wellbore. A logging tool is provided. The logging tool may be disposed on a wireline, a drill string, or a wired drill pipe. A formation property is obtained using the logging tool. The formation property may include a voltage (strictly speaking, not a formation property, but included here since it may be used in the sense that a formation property may be used), a bulk resistivity, a horizontal resistivity, a vertical resistivity, a porosity, a permeability, a fluid saturation, an NMR relaxation time, a magnetic field induced by a current, a sonic response, a borehole size, a borehole shape, a borehole fluid composition, an MWD parameter, or an LWD parameter. The maximum depth of investigation into the subsurface formation is determined using a model response and a noise level, and the volume of clearance is determined using the determined maximum depth of investigation. The maximum depth of investigation and volume of clearance may be determined even though no boundary layers are detected.

Other aspects and advantages will become apparent from the following description and the attached claims.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
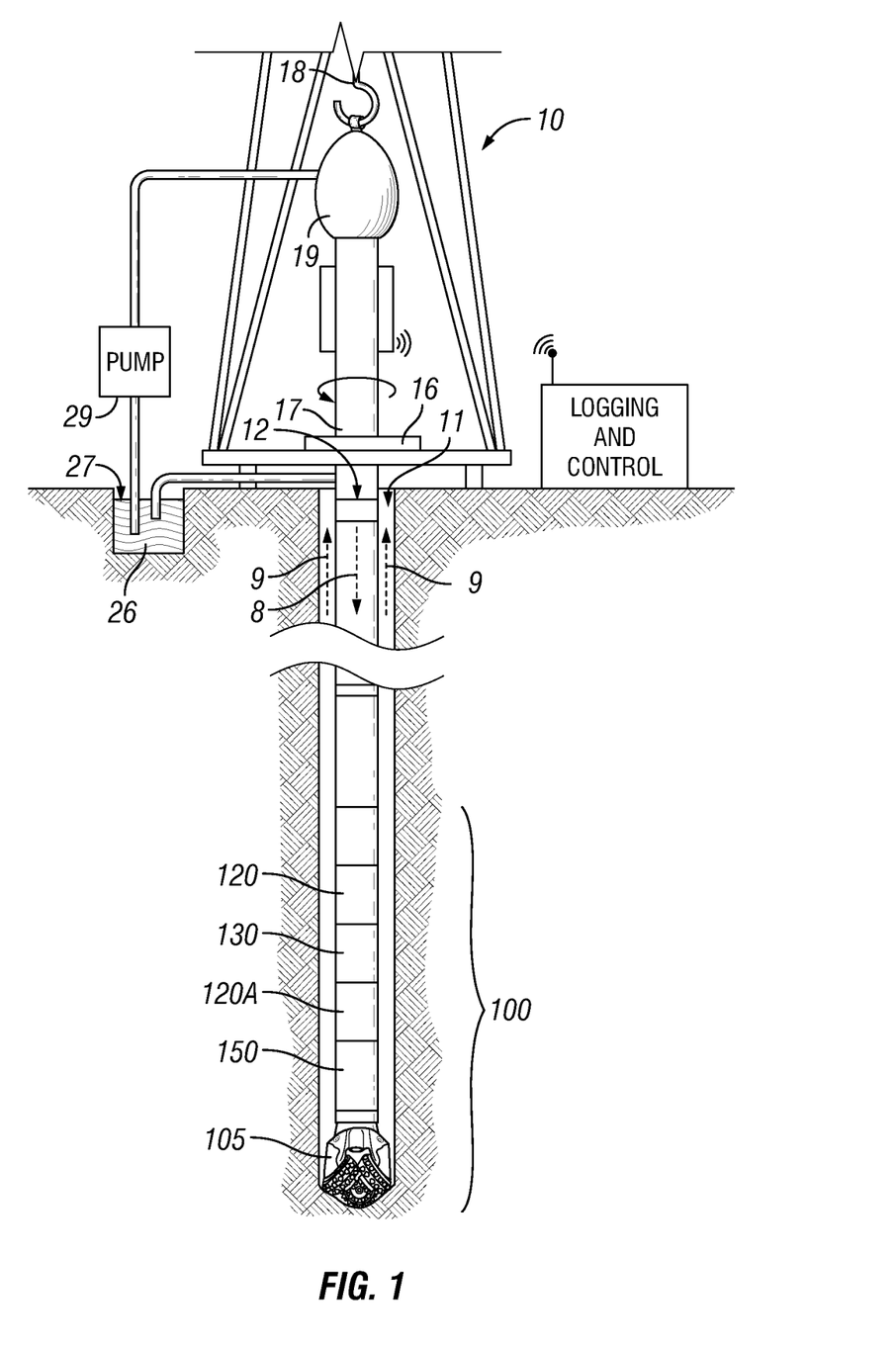
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
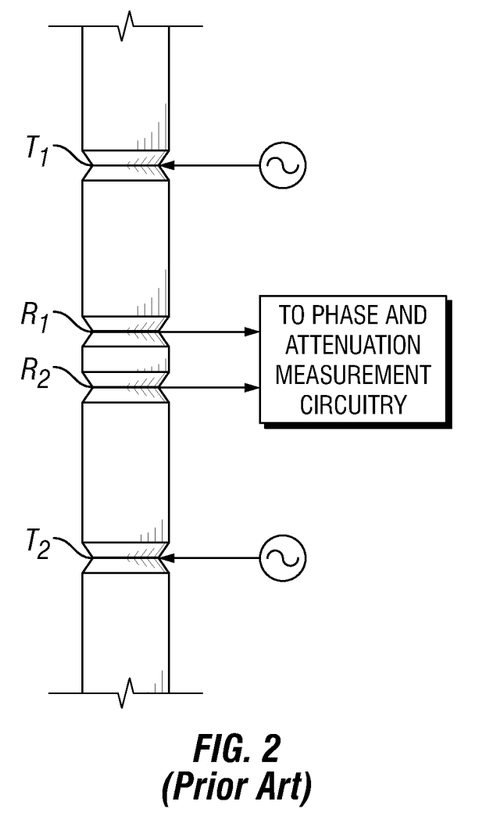
FIG. 2 shows a prior art electromagnetic logging tool.

An example of a tool which can be the LWD tool 120, or can be a part of an LWD tool suite 120A, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Recent electromagnetic (EM) logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually orthogonal. Typically, one antenna (coil) is axial and the other two are transverse. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Prior art logging tools/methods do not provide feedback or information to an operator to indicate the maximum depth of investigation of the tool when no boundary is detected. Most deep and azimuthally sensitive measurements have a depth of investigation that depends on the tool configuration, as well as the formation properties. As such, the depth of investigation (DOI), or volume of investigation (VOI) for azimuthally sensitive measurements, should not be considered constant. We shall use the acronyms "DOI" and "VOI" and their corresponding terms interchangeably herein.

The maximum DOI of a deep, azimuthal EM measurement for which no formation boundaries are identified can be determined and displayed. This information may be used to optimize the use of this type of measurement and also other types of deep-reading measurements. Applications include well placement, formation properties evaluation, and reservoir structure evaluation, to name a few examples. Those applications may be performed in real-time or in recorded mode. For convenience and clarity, the disclosure herein discusses EM measurements, but other measurement types may be used. Parameters may also be the result of computations made using one or more sensor measurements, such as resistivity of the formation, distance to a resistivity contrast, fluid (water, oil, and gas) saturation, formation pressure, fracture pressure, and permeability.

Data collected at various depths along a wellbore trajectory may be processed in real-time or it may be recorded and used in subsequent processing, or both. A specific data format is preferably used to allow data transfer through different 3-D representation platforms. The measurements themselves are typically measured versus time, but other domains may be used. Measurements are acquired, for example, with LWD and MWD tools, using downhole and surface sensors of pressure, temperature, fluid flow, and so forth. Because some parameters vary azimuthally around the circumference of the wellbore, certain logging sensors are designed to measure those azimuthally varying parameters. Those measurements allow for the detection and visualization of axial and azimuthal changes in formation and borehole conditions. Properties and contents of the formation matrix, formation fluids, borehole fluids, borehole cuttings and other constituent material, borehole size and shape, formation parameters, and fluid parameters may be investigated.

The data can be analyzed to determine a volume of clearance. For example, the volume of clearance may be a cylindrical volume centered on the tool axis. In one embodiment, the cylindrical volume of clearance is shaped like a "pillbox", having a radius proportional to the transmitter-receiver distance, and a relatively short "height" compared to that radius. Other volumes sizes and shapes are possible. Measurements may be analyzed to investigate the effect of the formation on the measurements, and to evaluate the overall sensitivity (e.g., maximum signal/noise ratio) for which a signal still carries discernable formation property information. The analysis provides for the detection and visualization of axial, azimuthal, and radial changes in formation property geometry. Once determined, a 3-D, spatially oriented volume of clearance positioned in a 3-D environment along the wellbore's trajectory, whether actual or proposed, may be displayed. Color-coding of one or more formation property boundaries may be produced in such a display. Multiple circles or ellipsoids of different size and shape, placed adjacently, may be generated to represent the change (or lack of change) in a volume of clearance. Also, a 3-D display of the distance between the tool and the maximum distance of investigation may be produced.

Using the obtained EM measurements, the vertical resistivity and horizontal resistivity of an anisotropic formation can be determined. Various frequencies and transmitter-receiver spacings (measurement couplings) are used to make the measurements, giving rise to various depths of investigation. The particular frequency and spacing combination that provides the deepest DOI, as a function of the determined resistivities, can be identified. The identified measurement coupling that provides the deepest DOI can be used to determine a noise threshold. The noise threshold is that level of noise for which the signal becomes unreliably difficult to ascertain and distinguish. The noise itself typically depends on the frequency and transmitter-receiver spacing and is characterized by the electronic noise of the tool.

Figure 3:
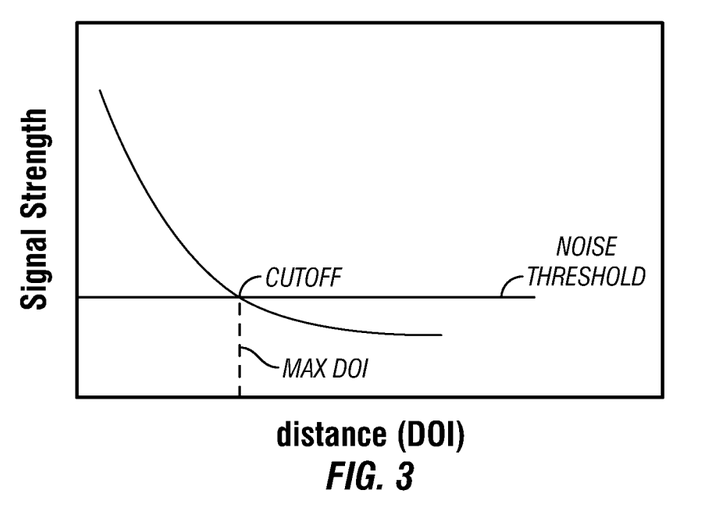
FIG. 3 is a plot of signal strength versus depth of investigation, in accordance with the present disclosure.

Returning to the determined resistivities, a resistivity ratio can be crafted that characterizes a desired or hypothesized resistivity contrast. In one embodiment, the numerator of the ratio is the determined horizontal resistivity, and the denominator is a user-defined or selected resistivity. The resistivity ratio and the identified measurement coupling can be used to model the signal response as a function of distance of the tool from a hypothetical or presumed bed boundary. The signal strength can be plotted against the depth of investigation distance, as shown in FIG. 3. A noise threshold can be set at multiple positions or values, as desired by a user. For example, it may be set at two or three times the standard deviation of the noise. Other values may be chosen based on other criteria. The noise threshold can be plotted on the modeled signal strength plot as a horizontal line. The noise threshold line intersects the curve of the signal strength plot at a point referred to herein as the "cutoff" point. It is assumed the signal strength below the noise threshold is too low to be reliable, thus the maximum DOI for which there is a reasonable level of confidence in the signal is that corresponding to the cutoff point. That is, a vertical line dropped from the cutoff point intersects the horizontal axis at the maximum DOI of the tool for the given measurement environment.

Figure 4:
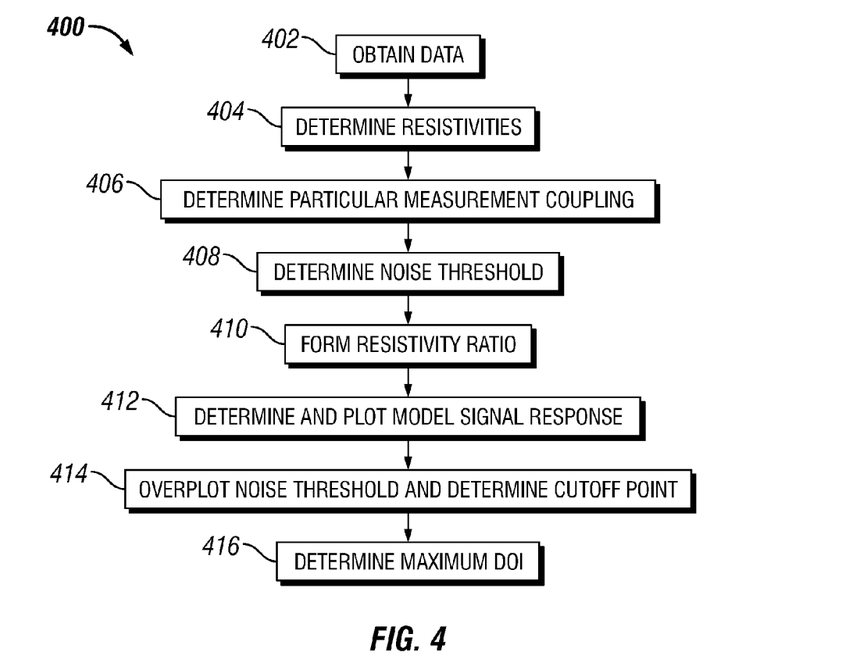
FIG. 4 is a flowchart showing the steps of an exemplary embodiment, in accordance with the present disclosure.

FIG. 4 shows a flowchart 400 in which the above steps are enumerated. In step 402, data is obtained and, if the data is EM data, the resistivities are determined (step 404). For other measurement types, other physical properties are determined and used similarly. The particular measurement coupling that yields the deepest DOI, as a function of the determined resistivities, is identified (step 406). The identified measurement coupling is used to determine a noise threshold (step 408). A resistivity ratio is formed using determined and selected resistivity values (step 410). A model signal response is determined as a function of DOI using the identified measurement coupling and the resistivity ratio, and plotted (step 412). The determined noise threshold is plotted on the signal response plot and a cutoff point determined (step 414). The maximum DOI is then determined based on the determined cutoff point (step 416).

One purpose of a DOI display is to graphically indicate to a user that even though no boundaries are detected by an inversion, based on the absence of signal, one can still conclude there are no boundaries within the distance indicated by the maximum DOI. Thus, a volume of clearance can be determined. A user can evaluate the maximum depth of investigation at each station based on selected inversion inputs. For example, the evaluation can be based on a resistivity profile or the results of other types of inversion. A resistivity profile may be predefined during pre-job work, or a user may input, for example, a conductive shoulder bed's resistivity, if known or estimated.

A detection range can be determined based on the inverted models. The DOI will generate a zone that can be marked distinctly and differently from the actual resistivity contrast so that it is not confused with a physical boundary. In one embodiment, three times the standard deviation of the noise of each measurement (e.g., 0.025 dB of attenuation of the azimuthal measurement, 0.15 degrees of phase shift in the azimuthal measurement) is used as a cutoff value when evaluating the maximum DOI. The DOI depends not only on the distance to the bed but also on the resistivity contrast or profile. The maximum DOI may be obtained from deep directional measurements taken from an input set of directional measurements. For example, if an input set of directional measurement includes 96 inch spacing measurements and 34 inch spacing measurements, the 96 inch spacing measurements are preferably used to determine the maximum DOI. If the input set of directional measurement includes 34 inch spacing measurements and 22 inch spacing measurements, the 34 inch directional measurements are preferably used to determine the maximum DOI.

For each station, formation model, and tool position, a maximum DOI for the tool can be determined. When the formation model is a two-layer model, the maximum DOI can be determined by moving the boundary position away until one of the deep directional measurements (likely the 96 inch) falls below three times the measurement's standard deviation. When the formation model is a three-layer model and the tool is in the center layer, the maximum DOI of the lower boundary can be obtained by fixing the upper boundary position, the tool position, the upper layer resistivity (Ru), the horizontal resistivity of the center layer (Rh), the vertical resistivity of the center layer (Rv), and the lower layer resistivity (Rl), and moving the lower boundary position away until the absolute signal difference between the deep directional measurements with and without the lower boundary is smaller than three times the measurement's standard deviation.

Figure 5:
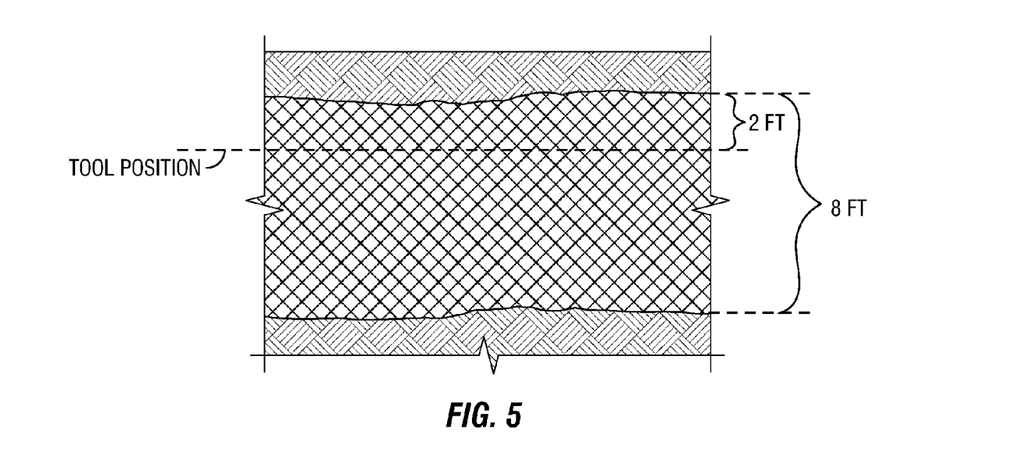
FIG. 5 schematically shows a three-layer model in which a logging tool tool is located two feet below an upper formation layer.
Figure 6A:
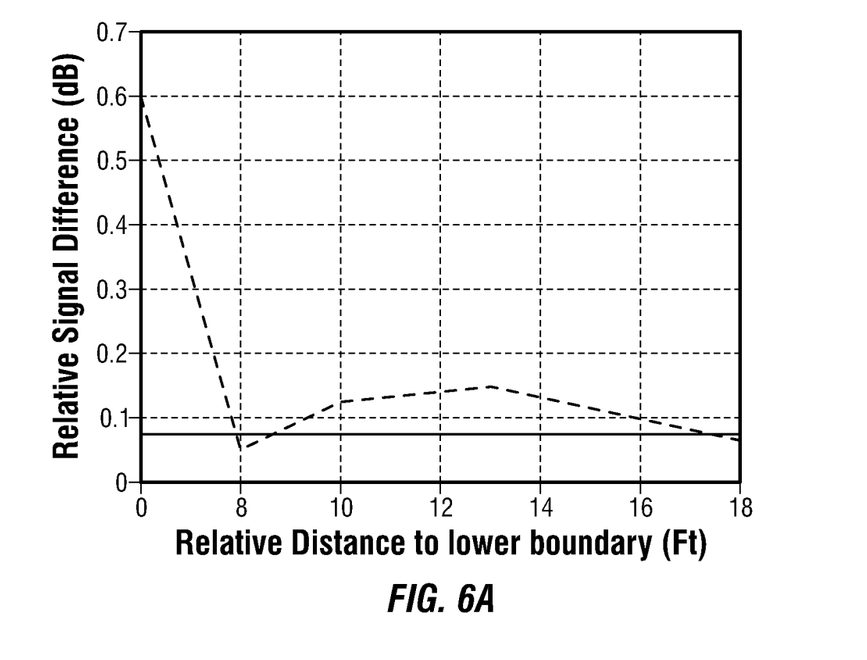
FIGS. 6A-6D are plots of the signal differences with and without the lower boundary, as a function of the distance between the lower boundary and the logging tool of FIG. 5.
Figure 6B:
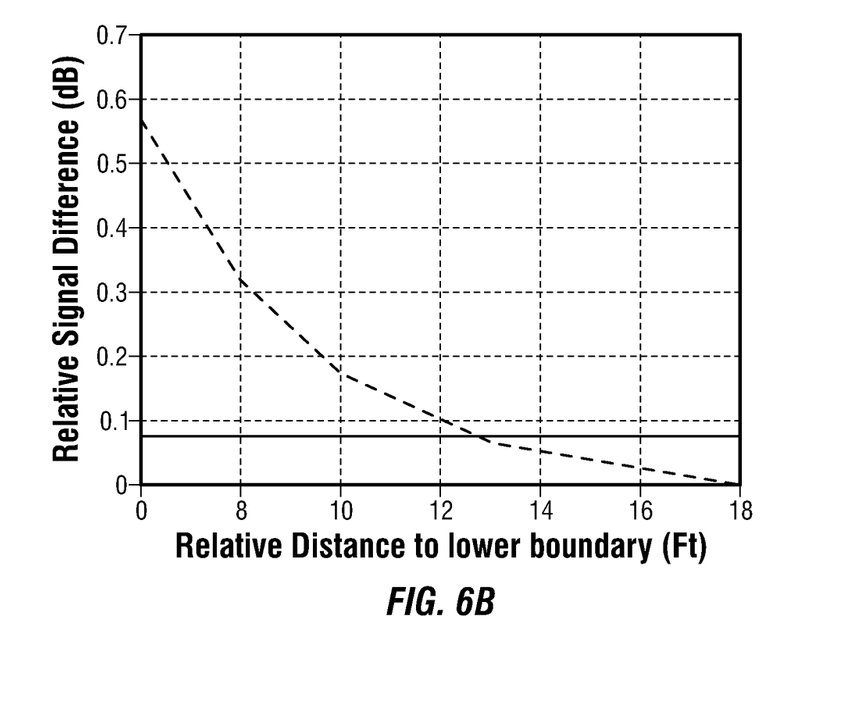
Figure 6C:
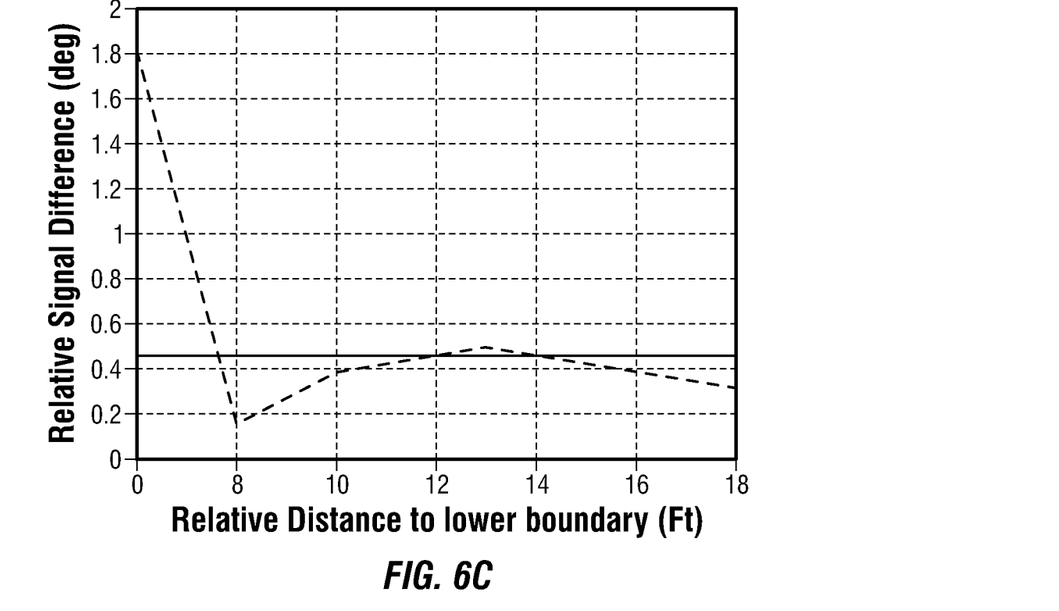
Figure 6D:
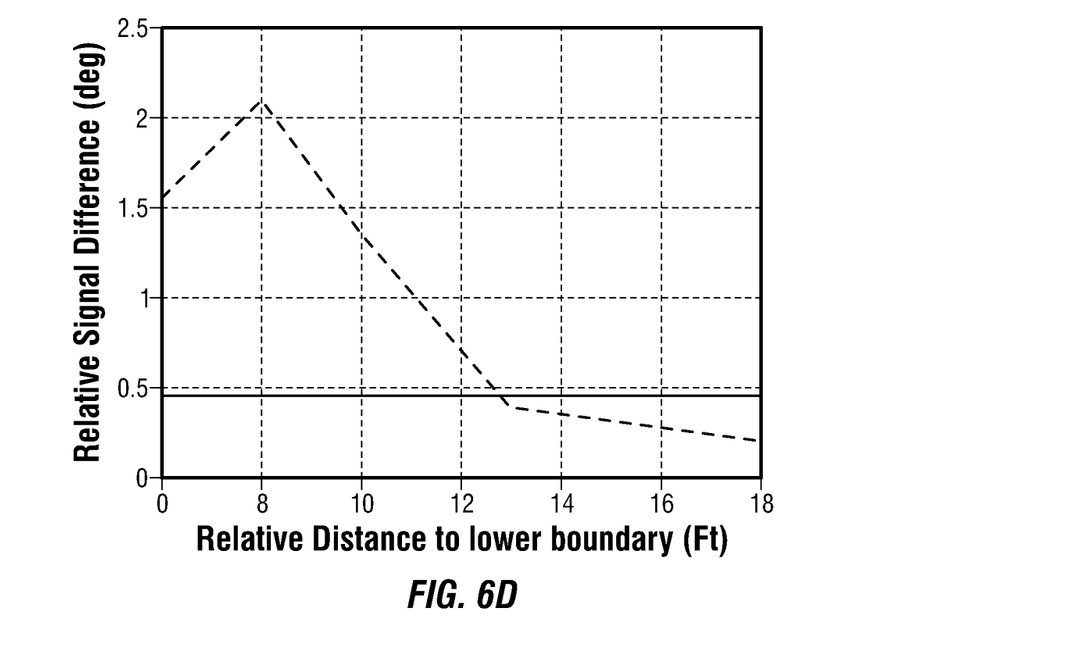

A synthetic three-layer example demonstrates the process. For this example, the input formation model has values of Ru=1 ohm-m, Rh=Rv=30 ohm-m, and Rl=2 ohm-m. The center bed thickness is eight feet and the tool position is two feet below the upper boundary, as shown in FIG. 5. The signal differences with and without the lower boundary are plotted in FIGS. 6A-6D as a function of the distance of the lower boundary to the tool position. From FIG. 6A (SAD1), the maximum DOI is 7.9 feet. In this case, the three times the measurement specification (0.25 db) generates two values: 7.9 feet and 17.6 feet. We select the shorter one. From FIG. 6B (SAD4), the maximum DOI is 12.5 feet; from FIG. 6C (SPD1), 7.6 feet; and from FIG. 6D (SPD4), 12.8 feet. Current commercial inversion methods can only provide one boundary solution, so the present process outputs a range from 7.6 feet to 12.8 feet for the maximum DOI towards the lower boundary. That means the directional measurements have sensitivity when the lower boundary is 12.8 feet away, however, current inversion methods will only output a lower boundary when the boundary is 7.6 feet away from the tool.

Similar logic can be used to determine the maximum DOI towards the upper boundary layer. When the formation model has more than 3 layers, the formation model is preferably simplified to a three-layer model first, and the method described above is used to get the maximum DOI range. To simplify a formation model to a three-layer model, a weighted average based on the formation conductivity and the distance to the tool measured from the center of the bed can be performed using the below equation.

$$\overline{C_u} = \frac{\sum_{i=1}^{N} e^{-d_{iu}} \times C_{iu}}{\sum_{i=1}^{N} e^{-d_{iu}}}, \overline{C_l} = \frac{\sum_{i=1}^{N} e^{-d_{il}} \times C_{il}}{\sum_{i=1}^{N} e^{-d_{il}}}$$

In that equation, $d_{iu}$ is the distance from the upper layer boundary to the center of the $i^{th}$ upper layer, $C_{iu}$ is the conductivity value of the $i^{th}$ upper layer, $d_{il}$ is the distance from the lower layer boundary to the center of $i^{th}$ lower layer, and $C_{iu}$ is the conductivity value of the $i^{th}$ lower layer.

The DOI defined in this case shares certain similarities with the signal-to-noise ratio alluded to above. Both indicate whether the measurement signals are good indicators of the existence of a boundary. However, the quantities are different. The signal-to-noise ratio provides a simple way to indicate whether the signal measured for a particular tool position is below the noise specification. However, any additional interpretation regarding the existence of a boundary far away is without merit. The DOI, on the other hand, indicates how far away the boundary needs to be before the measurement become insensitive to it, thus giving confidence to interpretation when the inverted boundary is within the calculated detection range.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine a volume of clearance surrounding a wellbore, comprising:
    placing a logging tool into the wellbore;
    obtaining a signal response from the logging tool corresponding to a measurement of a subsurface formation property of the wellbore, wherein the measurement of the subsurface formation property relates to one or more characteristics of materials along a trajectory of the wellbore at a plurality of depths; and
    using a processor configured to:
        determine the strength of the signal response of the logging tool as a function of radial depth of investigation distance with respect to the axis of the logging tool, wherein the signal response is modeled using the measurement obtained by the logging tool;
        select a noise threshold based at least partially upon the electrical noise of the logging tool and a frequency at which a signal is transmitted from the logging tool to obtain the measurement;
        determine a point of intersection between the signal response strength and the noise threshold, wherein the radial depth of investigation distance corresponding to the point of intersection represents a maximum radial depth of investigation; and
        determine the volume of clearance using the determined maximum radial depth of investigation.

2. The method of claim 1, wherein the obtaining the signal response corresponding to the measurement of the subsurface formation property comprises transmitting and receiving an electromagnetic signal transmitted at a certain frequency, or transmitting and receiving a plurality of electromagnetic signals, each of the electromagnetic signals being transmitted at different frequencies.

3. The method of claim 1, wherein the subsurface formation property includes at least one of a voltage, a bulk resistivity, a horizontal resistivity, a vertical resistivity, a porosity, a permeability, a fluid saturation, an NMR relaxation time, a magnetic field, a sonic response, a borehole size, a borehole shape, a borehole fluid composition, an MWD parameter, and an LWD parameter.

4. The method of claim 1, wherein no boundary layers are detected.

5. The method of claim 1, wherein the model response is derived from a formation model comprising three or more layers.

6. The method of claim 1, further comprising displaying the volume of clearance.

7. The method of claim 6, wherein the displaying comprises color-coding one or more formation property boundaries.

8. The method of claim 6, wherein the displaying comprises adjacently placing multiple circles or ellipsoids of different size and shape.

9. The method of claim 6, wherein the displaying comprises plotting a 3-D, spatially oriented volume of clearance positioned in a 3-D environment along a wellbore's trajectory.

10. A system comprising:
    an electromagnetic logging tool having a plurality of transmitter-receiver measurement couplings, wherein the electromagnetic logging tool is configured to be disposed within a subsurface formation of a wellbore and configured to obtain electromagnetic measurements corresponding to a measurement of a subsurface formation property of the wellbore, and wherein the electromagnetic measurements relate to one or more characteristics of materials along a trajectory of the wellbore at a plurality of depths; and
    a processor configured to:
    receive the electromagnetic measurements from the electromagnetic logging tool disposed in the subsurface formation;
    determine a noise threshold based upon a selected transmitter-receiver measurement coupling of the electromagnetic logging tool and the electrical noise of the electromagnetic logging tool;
    determine a resistivity ratio based upon the received electromagnetic measurements;
    model a signal response of the electromagnetic logging tool using the resistivity ratio;
    plot a first curve representative of the signal response as a function of signal strength and depth of investigation distance and a second curve representative of the noise threshold; and
    determine a maximum depth of investigation into the subsurface formation as the depth of investigation distance corresponding to where the first and second curves intersect on the plot.

11. The system of claim 10, wherein no boundary layers are detected.

12. The system of claim 10, wherein the processor is capable of determining a volume of clearance surrounding a wellbore in which the electromagnetic logging tool is disposed based on the maximum depth of investigation.

13. The system of claim 12, further comprising displaying the volume of clearance.

14. The system of claim 10, wherein the selected transmitter-receiver measurement coupling is one that provides the greatest depth of investigation for the electromagnetic logging tool relative to all other transmitter-receiver measurement couplings of the electromagnetic logging tool.

15. A method for determining a maximum depth of investigation comprising:
   disposing an electromagnetic logging tool having a plurality of transmitter-receiver spacings into a borehole formed in a subsurface formation;
   obtaining electromagnetic measurements from the electromagnetic logging tool corresponding to a measurement of a subsurface formation property of the borehole, wherein the electromagnetic measurements relate to one or more characteristics of materials along a trajectory of the borehole at a plurality of depths;
   using a processor to:
   determine a noise threshold based at least partially upon a selected transmitter-receiver spacing of the electromagnetic logging tool and the electrical noise characteristic of the electromagnetic logging tool;
   determine a resistivity ratio based upon the obtained electromagnetic measurements;
   model a signal response of the electromagnetic logging tool using the resistivity ratio;
   plot a first curve representative of the signal response as a function of signal strength and depth of investigation distance;
   plot a second curve representative of the noise threshold on the same plot as the first curve; and
   determine a maximum depth of investigation into the subsurface formation as the depth of investigation distance corresponding to where the first and second curves intersect on the plot.

16. The method of claim 15, wherein the electromagnetic measurements comprise a horizontal resistivity and a vertical resistivity.

17. The method of claim 16, wherein the resistivity ratio is determined as a ratio of horizontal resistivity to a user-defined resistivity that results in a desired resistivity contrast.

18. The method of claim 15, wherein the selected transmitter-receiver spacing is one that provides the greatest depth of investigation for the electromagnetic logging tool relative to all other transmitter-receiver spacings of the electromagnetic logging tool.

19. The method of claim 15, wherein the maximum depth of investigation is used to determine a volume of clearance centered on the axis of the electromagnetic logging tool.

20. The method of claim 15, wherein when the first curve and second curve intersect at more than one point, the point corresponding to a lesser depth of investigation distance is selected as the maximum depth of investigation.

* * * * *